Figure 1:
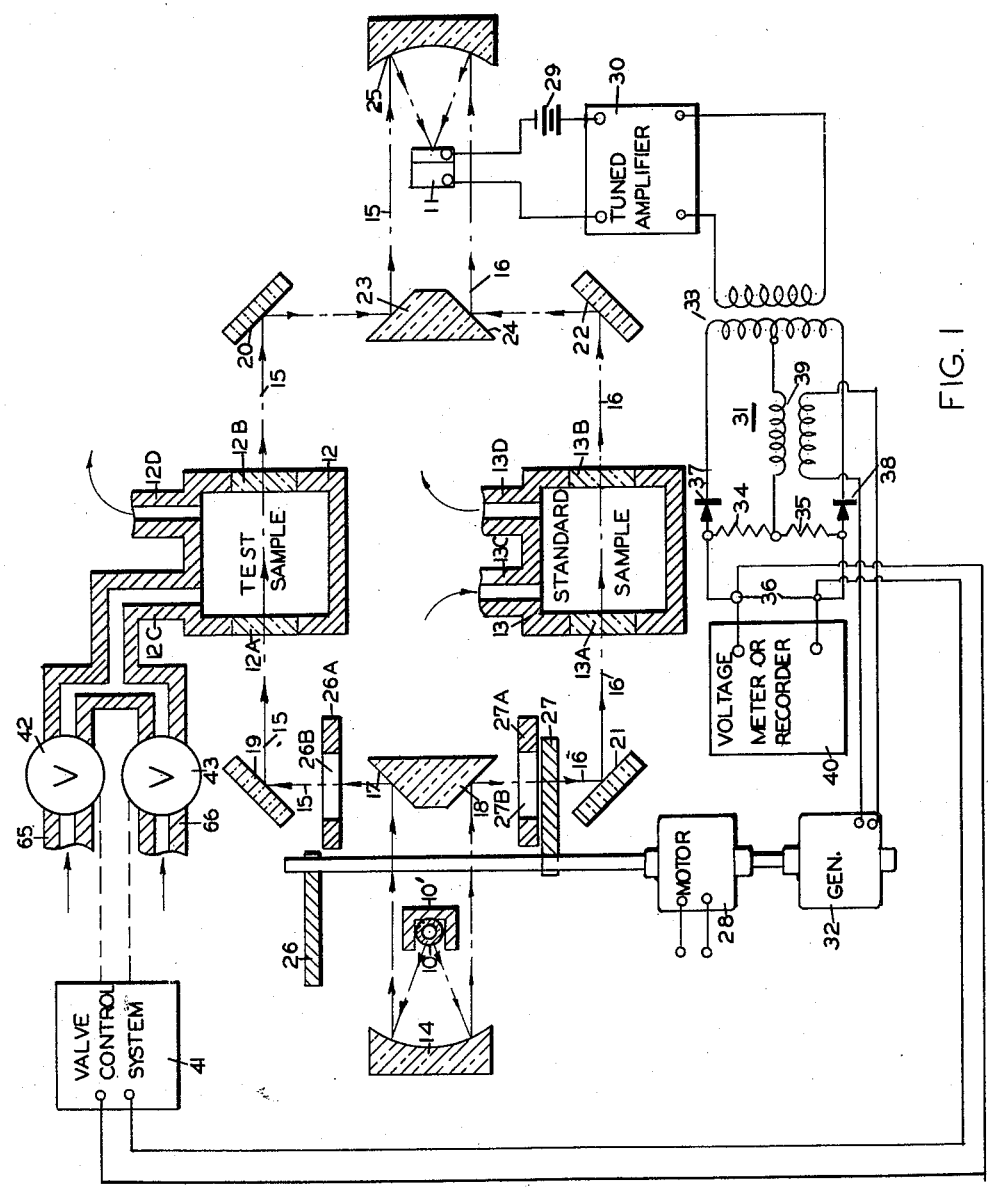

NOEL C. JAMISON, OTTO G. KOPPIUS,
THOMAS R. KOHLER & JAMES G. BLACK
INVENTORS

BY Fred M. Vogel
AGENT

April 3, 1951  N. C. JAMISON ET AL  2,547,212
APPARATUS FOR DETERMINING THE
COMPOSITION OF A SUBSTANCE Filed Jan. 17, 1948  3 Sheets-Sheet 2

NOEL C. JAMISON, OTTO G. KOPPIUS,
THOMAS R. KOHLER & JAMES G. BLACK
INVENTORS

BY Fred M. Vogel
AGENT

April 3, 1951    N. C. JAMISON ET AL    2,547,212
APPARATUS FOR DETERMINING THE
COMPOSITION OF A SUBSTANCE Filed Jan. 17, 1948    3 Sheets-Sheet 3

NOEL C. JAMISON OTTO G. KOPPIUS
THOMAS R. KOHLER & JAMES G. BLACK
INVENTORS

BY Fred Eu. Vogel
AGENT

Patented Apr. 3, 1951

2,547,212

UNITED STATES PATENT OFFICE 2,547,212

APPARATUS FOR DETERMINING THE COMPOSITION OF A SUBSTANCE

Noel C. Jamison, Otto G. Koppius, and Thomas R. Kohler, Irvington on Hudson, N. Y., and James G. Black, Richmond, Ky., assignors to Philips Laboratories, Inc., Irvington on Hudson, N. Y.

Application January 17, 1948, Serial No. 2,953

6 Claims. (Cl. 250—83.3)

This invention relates generally to the analysis of substances by radiant energy and more particularly to a method and means for continuously analyzing various chemical mixtures by automatically measuring the difference which exists between the extent of absorption of radiant energy in a standard sample of the mixture and in a sample to be tested.

In chemical processes involving mixtures of chemical compounds it is often desirable to analyze the mixture continuously in order to retain certain prescribed conditions or to avoid the formation of undue amounts of chemical constituents. Thus, for example, in the separation of a mixture of butylene and butadiene by the process of distillation a continuous check of the mixture is advantageous in that it enables control of the process to be effected in accordance with the analysis so as to realize optimum distillation efficiency.

Many chemical compounds exhibit spectra in the infra-red region which are characterized by relatively intense absorption bands when infra-red radiation is transmitted therethrough. In one known instrument whose operation is based on this phenomenon, a source of infra-red radiation is provided, a standard sample of the substance is interposed in the path of a first beam emanating from one area of the source and directed toward a first detector in the form of a thermopile or a bolometer, and an unknown sample under test is interposed in the path of a second beam emanating from another area of the source and directed toward a second detector. By comparing the readings of the first and second detectors, the overall absorption of the test sample relative to the standard sample may be ascertained and thereby the extent of deviation in the composition of the test sample with reference to the standard sample.

The above-described instrument suffers from a number of drawbacks which impair its accuracy and reliability. One disadvantage arises from the fact that the two beams originating from different areas in the source may not be of like intensity or may fail to maintain a constant relative intensity in the course of operation so that an erroneous comparison is obtained. This defect usually arises in the infra-red source due to the formation of hot spots therein during operation whereby a particular area in the source emits a greater amount of radiant energy than another area. Moreover, the two detectors may differ in their response characteristics as a result either of their inherent properties or the fact that the one beam strikes one detector on a particular area having a certain sensitivity whereas the other beam strikes the second detector on an area having a sensitivity at variance with that of the first detector. Also an important factor in introducing error is that the two detectors may be operating under different conditions of ambient temperature and, in the case of detectors of the bolometer type, under different conditions of energizing potential.

In view of the foregoing drawbacks, it is the primary object of this invention to provide an improved method and apparatus for infra-red analysis based on the absorption principle and characterized by a high order of stability, sensitivity and accuracy.

More specifically, it is an object of this invention to provide infra-red apparatus for continuously analyzing a substance by automatically measuring the difference between the degree of absorption of a standard sample thereof relative to a sample under test.

It is a further object of this invention to provide an instrument of the above type wherein the relative absorption of a standard sample and a test sample is measured by means including but a single infra-red detector.

Another object of this invention is to provide an infra-red analyzer of the above type wherein two separate analyzing beams of equal intensity are derived from a common area in a single source of infra-red radiation.

In general terms, a method in accordance with the present invention for analyzing a sample of a substance to be tested entails the steps of splitting a beam derived from a common area in a single source of infra-red radiation into two analyzing beams having the same intensity, alternately interrupting or cutting off the two analyzing beams, passing one of the two beams through a test sample of the substance and the other through a standard sample thereof, and then generating a voltage whose amplitude varies alternately in accordance with the change in intensity of said one beam resulting from absorption by the test sample and the change in intensity of said other beam resulting from absorption by the standard sample. The phase and amplitude of the resultant alternating voltage is then indicated to furnish an index as to the composition of the test sample relative to the standard sample, or said alternating voltage may be utilized to control a chemical or mechanical process involving the test substance in accordance with the analysis thereof so as to prevent a departure in the composition of the test substance from that of a standard.

Briefly stated, one preferred form of apparatus according to the principles underlying the present invention includes a source of infra-red radiation and an optical system for splitting a main collimated beam derived from one area of said source into two analyzing beams of equal intensity one of which is directed through a cell containing a standard sample and then focused on an infra-red detector and the other of which is directed through a cell containing a standard sample and then focused on the same detector. Also included are shutter means for successively interrupting the two analyzing beams whereby the detector yields an alternating voltage component whose amplitude depends on the relative intensities of the analyzing beams as a result of absorption by the standard sample and the test sample and whose phase depends on whether the intensity of the one beam is greater or less than the other. By measuring the phase and amplitude of the alternating voltage component and knowing the composition of the standard sample, an analysis is furnished of the sample under test.

For a better understanding of the invention as well as other objects and further features thereof, reference is had to the following detailed description of the invention to be read in connection with the accompanying drawing wherein like components in the several figures are designated by like reference numerals.

Figure 2:
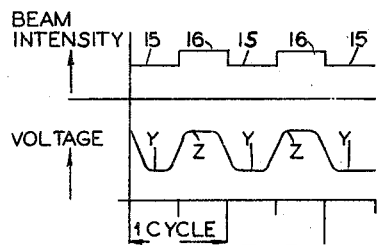
Figure 2:
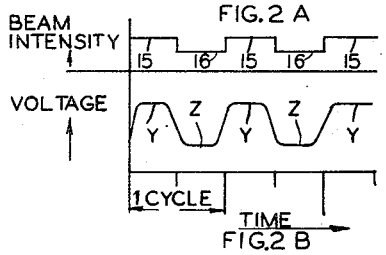
Figure 2:
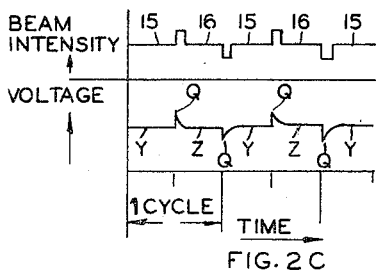
Figure 2:
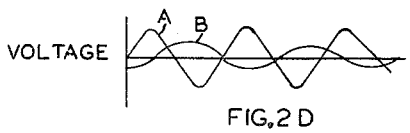
Figure 5:
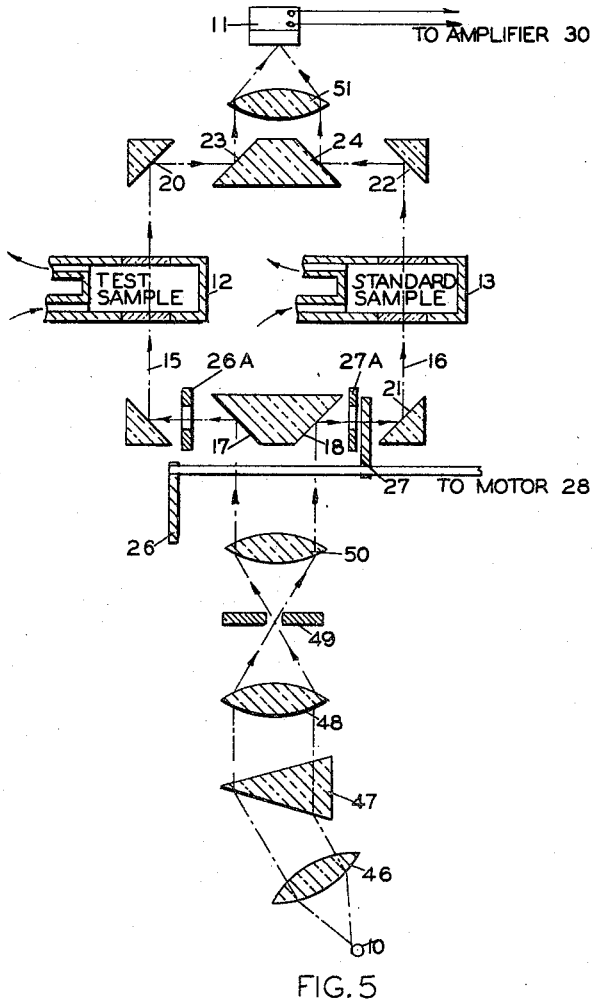
Figure 6:
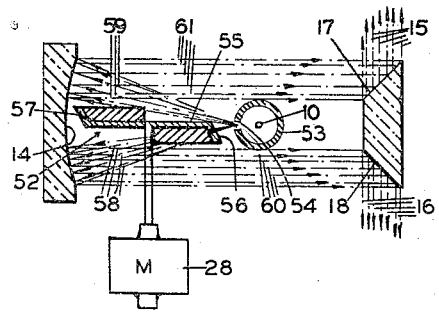
Figure 7:
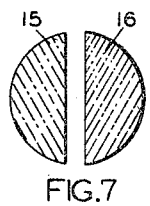
Figure 3:
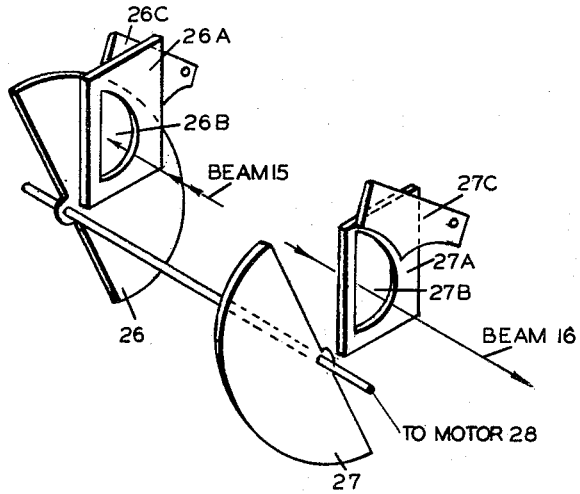
Figure 4:
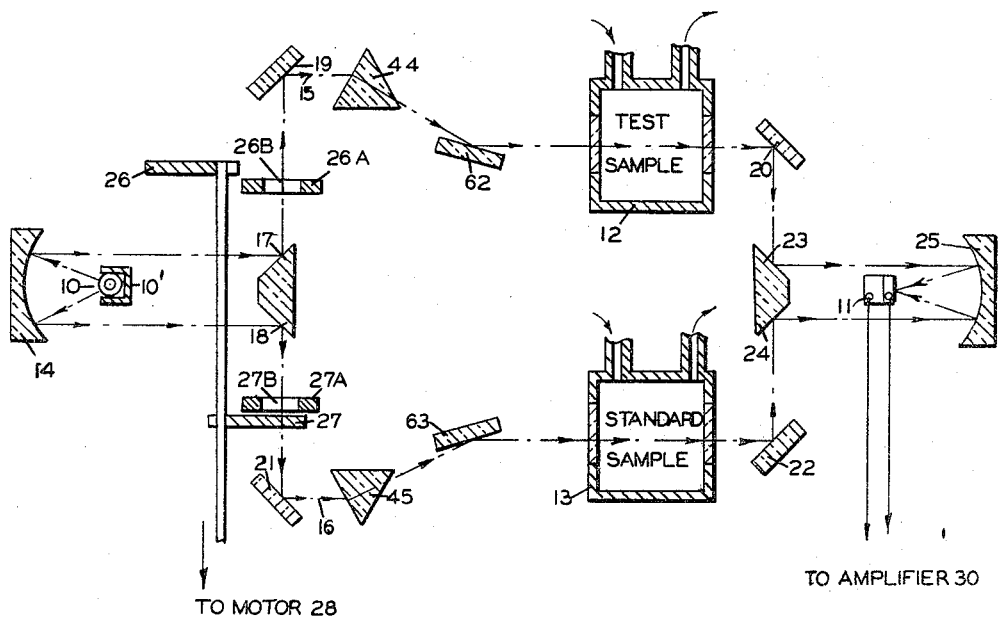

In the drawing:

Fig. 1 is a schematic representation of one preferred embodiment of an infra-red analyzer in accordance with the present invention, Figs. 2A, B, C and D are graphs showing various voltage wave forms developed in the embodiment of Fig. 1, Fig. 3 is a perspective view of the shutter means in Fig. 1, Fig. 4 shows schematically another preferred embodiment of the invention, Fig. 5 is a schematic illustration of still another preferred embodiment of the invention, Fig. 6 shows a modification of the beam splitting and shutter means in Figs. 1 and 4, and Fig. 7 illustrates the cross sectional areas of the two analyzing beams projected in the systems of Figs. 1, 4 and 5.

Referring now to Fig. 1, an infra-red analyzer according to the invention comprises a source 10 of infra-red radiation, an infra-red detector 11, a cell 12, incorporating suitable front and back windows 12a and 12b in axial alignment, for exposing a sample of the substance being tested to an infra-red analyzing beam, and a similar cell 13 for containing a sample of standard quality and including windows 13a and 13b. The windows of cells 12 and 13 are constructed of a solid material, such as quartz, rock salt or lithium fluoride, which will transmit radiation of the wave lengths absorbed by the substance to be determined by the analysis. The windows may, if desired, be formed of a substance which will serve as a filter for screening out the wavelengths remote from those required for the analysis. By way of example, it is assumed that the substance being tested is a continuous stream of a gaseous or liquid mixture and with this in view the cells 12 and 13 are provided with suitable inlet and outlet flow ducts 12c, 12d, and 13c, 13d, respectively.

The rays emitted from the front area of source 10 are cast on a concave spherical mirror 14 and are reflected thereby as a substantially collimated main beam having a circular cross section, the source being positioned as the focal point of the mirror. The main beam projected by spherical mirror 14 is divided equally into two separate analyzing beams by means of a double reflector constituted by plane mirrors 17 and 18. Analyzing beams 15 and 16 each have, as shown in Fig. 7, the contours of a segment of a circle. Mirrors 17 and 18 are angularly arranged so as to reflect the analyzing beam, represented by arrow lines 15 and 16, in opposite directions normal to the path of the main beam. A baffle member 10' is disposed behind source 10 to prevent radiation from the rear and side areas of the source directly towards mirrors 17 and 18.

Analyzing beam 15 strikes a plane mirror 19 which directs it in a path parallel to the main beam and running through the windows 12a and 12b of sample cell 12 and onto a plane mirror 20. Similarly, analyzing beam 16 impinges on a plane mirror 21 which directs it through the windows 13a and 13b of standard cell 13 and onto a plane mirror 22.

A double reflector constituted by plane mirrors 23 and 24 is provided in association with a concave spherical mirror 25. Analyzing beams 15 and 16 are directed in parallel relation by reflecting mirrors 23 and 24, respectively, onto spherical mirror 25 which acts to concentrate the beams on the face of detector 11 disposed at the focal point thereof.

Analyzing beams 15 and 16 are alternately interrupted by means of rotating shutter members 26 and 27 which are driven at a uniform rate on a common shaft by an electric motor 28. As shown separately and in greater detail by Fig. 3 the shutter members 26 and 27 are formed by semi-circular plates which are affixed to the shaft at positions displaced 180° from each other. Shutter 26 is operatively interposed in the path of analyzing beam 15 between mirrors 17 and 19 and cooperates with a stationary mask 26a having a port 26b shaped as the segment of a circle and arranged to accommodate beam 15. Shutter 27 is operatively interposed in the path of analyzing beam 16 between mirrors 18 and 21 and cooperates with a similar mask 27a having a port 27b to accommodate beam 16.

Assuming in Fig. 3 a clockwise motion for the shaft of motor 28, the arrangement is such that the straight edges of shutter plates 26 and 27 when in the vertical position are in alignment with the corresponding edges of ports 26b and 27b. As the rotation continues, shutter plate 26 proceeds to expose progressive sectors of ports 26b, while shutter plate 27 concurrently blocks progressive sectors of port 27b. Accordingly, an equivalent sector of one port is covered as a sector of the other port is exposed, and at the instant said one port is fully covered the other is entirely exposed. The period commencing at the vertical position of shutter plates 26 and 27 and terminating at the position when one port is fully covered and the other fully open will hereinafter be referred to as the changeover period. The changeover period, therefore, is the interval wherein concurrently one beam is being shutoff and the other is being unblocked.

The cross sectional areas of ports 26b and 27b are preferably dimensioned to be somewhat smaller than that of analyzing beams 15 and 16 so as to afford more sharply defined beams. To facilitate minor corrections in the intensities of beams 15 and 16 there are provided shading plates 26c and 27c adjustably positioned to overlap the upper portions of ports 26b and 27b. Each shading plate is formed with an arcuate edge whose contour is congruent with the curvature of the ports. Shading plates 26c and 27c are each pivotally mounted at a point whereby, for each overlapping position of the plate, substantially the same relative degree of shading is effected for each sector of the associated port. In this way during the changeover period a uniform curve of shutter action is maintained regardless of the adjusted position of the shading plate. This feature is advantageous in that for purposes of accuracy in measurement it is desirable to shut off progressively one beam in the same manner as the other beam is unblocked. Thus during one half of a cycle in the rotation of motor 28, analyzing beam 15 traverses sample cell 12 while analyzing beam 16 is blocked, and during the remaining half of the cycle analyzing beam 16 passes through standard cell 13 while analyzing beam 15 is cut off. As a consequence, analyzing beams 15 and 16 are successively incident to detector 11, the relative intensities of the beams being determined by the relative absorption thereof as effected by sample cell 12 and standard cell 13.

Detector 11 is preferably in the form of a bolometer having an exposed thermally-responsive resistance element whose ohmic value varies inversely as the intensity of infra-red radiation incident thereto. Detector 11 is connected in series with a potential source 29 to the input of a tuned alternating-current amplifier 30.

The resultant voltage wave appearing at the input terminals of amplifier 30 will be discussed in conjunction with Figs. 2A, B and C which show graphically the wave forms obtained under three possible conditions of relative infra-red intensity of analyzing beams 15 and 16. In Figs. 2A, B and C, the curve plotted in the upper sections of the graph indicates the relative intensities of beams 15 and 16 while the lower section displays the resultant voltage wave produced by detector 11. Referring now to Fig. 2A, it will be assumed that the intensity of analyzing beam 15 is less than that of beam 16, so that letter $y$ indicates the voltage level during the half cycles beam 15 is active and letter $z$ indicates the voltage level during the alternate half cycles during which beam 16 is active. It will be noted that upon the incidence of beam 16, the voltage rises exponentially to level $z$ and upon the incidence of beam 15, the voltage drops exponentially to level $y$. This exponential rise and fall is due to the inherent thermal lag of detector 11.

Now let us assume the converse condition, as shown in Fig. 2B, where the intensity of beam 15 is greater than that of beam 16, letter $y$ again representing the voltage level produced by beam 15 and letter $z$ that of beam 16. It will be evident from an inspection of Figs. 2A and B that the output voltage produced by detector 11, when the applied beams are of different intensity, has an alternating current component whose amplitude depends on the degree of difference existing between the intensities of analyzing beams 15 and 16 and whose phase depends on whether the intensity of beam 15 is large or small with respect to beam 16. That is, as the intensity of analyzing beam 15 steps from a condition of greater intensity to smaller intensity relative to beam 16, the phase of the alternating current component reverses. It will also be apparent that the fundamental frequency of the alternating current component corresponds with the rate of rotation of motor 28.

Finally let us assume the condition as shown in Fig. 2C where the beams are of substantially equal intensity. Since, in this case, the individual voltage levels produced by both beams are alike, the level of output voltage is unvarying except for the voltage pulses of alternating polarity occurring at the period of changeover from beam 15 to 16 said pulses being designated by letter $q$. Ideally, in the changeover period in the case where the intensities of beams 15 and 16 are balanced and when one beam is being cutoff while the other is concurrently being unblocked, the reduction in the intensity of the one beam should at all times in the course of the changeover period exactly equal the increase in intensity of the other beam so that no change occurs in the total amount of radiation striking detector 11. However, in practice, it is virtually impossible to provide a shutter system having such mechanical tolerances as to perfectly attain this effect. Hence an infra-red surge will occur at the period of changeover, resulting in pulses $q$. Thus it is seen that should the sample and the standard have identical absorption properties, hence identical compositions, only alternating pulses will appear in the output of detector 11, the frequency of the pulses corresponding with the frequency of the alternating current component.

It is to be understood that alternating pulses as well as an alternating current component will appear in the output of detector 11 in those cases where the beams are of unequal intensity. For the sake of simplicity, however, these pulses have been omitted from the graphs in Figures 2A and B.

Tuned amplifier 30 may be of any conventional design incorporating suitable selective filter means to amplify chiefly the fundamental frequency component of the alternating current component and of the alternating pulses developed in the output of detector 11. Inasmuch as the alternating-current component and the alternating pulses are not of sinusoidal form, amplifier 30 discriminates against the other frequency components inherent in these waves as well as widely dispersed extraneous noise frequencies, thereby improving the sensitivity of the system. One form of amplifier suitable for this purpose is disclosed in the "Radio Engineers' Handbook" of F. E. Terman (1st edition—Fig. 53, page 946) wherein an amplifier is provided with a negative feedback circuit consisting of a parallel-T null network. At the null frequency, that is, the desired frequency, there is no feedback and the full gain of the amplifier is realized. However at other frequencies feedback occurs which sharply reduces the gain.

As illustrated in Fig. 2D, the output wave yielded by amplifier 30 may be resolved into a first sinusoidal wave $a$ which is derived from the applied alternating current component and a wave $b$ derived from the applied alternating pulses. It is important to note that since the pulses are generated in the changeover period of beams 15 and 16, wave $b$ is approximately 90° displaced in phase from wave $a$.

The output of amplifier 30 is impressed on a phase discriminator circuit 31 which is arranged to suppress wave $b$ and to provide a direct-current measuring voltage whose polarity is determined by the phase of wave $a$ and whose magnitude is proportional to the amplitude thereof. The phase of the applied wave $a$ is compared with the phase of a reference alternating voltage produced by a generator 32. Generator 32 is driven by motor 28 in synchronism therewith so that the frequency of the reference voltage always corresponds with the frequency of waves $a$ and $b$ in the output of amplifier 30. The output of generator 32 is adjusted so that the phase of the reference voltage is coincident with a given phase of wave $a$. This may readily be accomplished by either shifting the field coil of the generator to the proper position or by means of an external phase shifting network.

Discriminator 31 includes a transformer 33 having a primary winding connected to the output of amplifier 30, and a centertapped secondary winding. A pair of series-connected resistors 34 and 35 are connected across output terminals 36, one terminal thereof being connected through a rectifier 37 to one end of the secondary of transformer 33, and the other terminal being connected through a rectifier 38 to the other end of the secondary. A transformer 39 is provided having a primary winding connected to generator 32 and a secondary winding connected between the junction of resistors 34 and 35 and the centertap of the secondary of transformer 33.

The behavior of discriminator 31 is as follows: In the absence of an applied wave, the reference alternating voltage in the secondary of transformer 39 is rectified by rectifier 37 to develop a direct voltage across resistor 34 and is simultaneously rectified by rectifier 38 to develop a direct voltage of equal magnitude but of opposite polarity across resistor 35. As a result, the direct voltages cancel each other and no measuring voltage is established at output terminals 36.

In the event a wave $a$ of a given amplitude is applied to transformer 33, the applied wave $a$ is split in phase by the secondary of the transformer so that the phase of applied voltage in one half of the secondary is displaced 180° from the phase in the other half. Consequently the reference voltage which combines with the applied wave $a$ is in phase coincidence with the applied wave $a$ in one half of the secondary and in phase opposition in the other half. The respective magnitudes of the opposing voltages across resistors 34 and 35 are therefore unequal and the resultant measuring voltage yielded at terminals 36 has a magnitude and polarity determined by the difference between the opposing voltages. Should the applied wave $a$ now be reversed in phase, the measuring voltage will be reversed in polarity. Thus the measuring voltage established at terminals 36 affords an index both as to the phase and amplitude of the applied wave $a$, hence the relative intensities of analyzing beams 15 and 16.

Now in the event the wave $b$ is applied to discriminator 31, wave $b$ being shifted in phase 90° from wave $a$, wave $b$ will be split in phase in the secondary of transformer 33 so that the reference voltage will combine vectorially with a wave displaced 90° therefrom in one half of the secondary and 270° in the other half. As a result, equal direct voltages of opposite polarity will be developed across resistors 34 and 35 and no measuring voltage will appear at terminals 36. Accordingly, a null measuring voltage indicates the condition of balanced beams and therefore a test sample having the same composition as the standard sample.

It is to be understood that the circuit of phase discriminator 31 is shown merely by way of illustration, any known discriminator being suitable for purposes of the invention.

It should be noted that the use of a tuned alternating-current amplifier 30 in conjunction with a phase discriminator 31 enables the accurate determination of the relative intensity of the beams despite the existence of mechanical deficiencies in the shutter means which result in the production by detector 11 of alternating pulses as well as an A.-C. component indicative of the relative intensity.

The measuring voltage at terminals 36 is fed to a zero-center D.-C. voltmeter to provide a direct reading, or to a recorder 40. Recorder 40 may be any usual form of recording instrument adapted to record a voltage continuously on a moving chart or tape, such as the well known Leeds and Northrup automatic potentiometer known under the trade-mark "Micromax." To facilitate readings the chart may be calibrated in terms of chemical composition. If desired, the measuring voltage may also be utilized to operate a control means 41 so as to continuously adjust the proportions of the sample mixture to conform with that of the standard. This may be accomplished in a conventional manner by means of valves 42 and 43 interposed in the mixing pipes 65 and 66 connected to the inlet duct 12c of cell 12, the valves being actuated by relays included in control means 41 and energized in accordance with the measuring voltage to effect the desired proportioning of the fluid mixture. The measuring voltage may also be utilized for governing the temperature, pressure, rate of flow or other variable condition in a system for processing the substance under analysis. Methods and means for employing a variable output voltage of any system to control or adjust one or more variables are well known and are illustrated in U. S. Patent 2,118,842. Such known techniques may be applied in conjunction with the apparatus disclosed herein to control the system for handling the mixture being analyzed in accordance with the composition of the latter so as to maintain uniform operation and results.

It should be noted that the radiation transmitted through cells 12 and 13 is not dispersed; that is to say it contains all the wavelengths emitted by the infra-red source 19 except for those absorbed by the windows of cells 12 and 13. Accordingly, the instrument in Fig. 1 functions to indicate the extent of total absorption by a sample substance of all the transmitted wavelengths relative to the total absorption by a standard substance. It is also to be understood that by reason of the fact that the two analyzing beams are derived from a common area in a single source of radiation, the relative intensities of the two beams resulting from absorption is not altered by fluctuations in the source. Nor is the fact that the bolometer 11 incorporates an element having diverse areas of sensitivity detrimental to the accuracy of the system since the two analyzing beams 15 and 16 are incident to a common area therein. It will also be appreciated that the use of a single detector obviates those errors which arise due to disparate operating conditions in systems using a pair of detectors.

For certain forms of analysis, in order to obtain a higher order of sensitivity and therefore greater accuracy of readings, it may be desirable to employ monochromatic radiation rather than the heterochromatic radiation of the system of Fig. 1. By monochromatic radiation is meant radiation within a very narrow predetermined band. In the event an infra-red analyzing beam which is not dispersed is passed through a substance which absorbs only certain distinctive wavelength bands, the reduction in the overall intensity of the beam will be slight as only these bands will be attenuated whereas the other bands of the beam will be transmitted without perceptible reduction in intensity. Therefore dispersion means in conjunction with the system of Fig. 1 has been found advantageous in these instances. For example it is known that carbon dioxide ($CO_2$) has sharp infra-red absorption bands at wavelengths of 4.5 microns and 14.5 microns and that carbon monoxide (CO) absorbs an appreciable amount of radiation solely at 4.5 microns. If an unknown sample of gas containing a mixture of $CO_2$ and CO is studied and compared with a standard sample, and radiation at 4.5 microns is employed for studying the unknown sample while radiation at 14.5 microns is employed for the standard sample, a simple and direct quantitative measurement of the amount of CO in the unknown sample is quickly obtained. This is accomplished by first filling the standard cell with the desired amount of $CO_2$ and then filling the test cell with $CO_2$ until the two analyzing beams are balanced, thereby indicating a like quantity of $CO_2$ in the test cell. Thereafter the sample cell is supplied with CO to an extent indicated by the relative intensities of the beam.

Apparatus based on this principle is illustrated in Fig. 4 which is identical in all respects with Fig. 1 save that interposed between mirror 19 and test sample cell 12 in the path of beam 15 is a dispersion prism 44 and a plane mirror 62, while interposed between mirror 21 and standard cell 13 in the path of analyzing beam 16 is a dispersion prism 45 and a plane mirror 63. Mirror 62 and prism 44 are oriented so as to direct monochromatic radiation of a selected wavelength band through cell 12, the other wavelengths being diverged from the path of beam 15. Similarly, mirror 63 and prism 45 are angularly arranged so as to direct through cell 13 monochromatic radiation of a selected wavelength band which may be the same or, as in the above-given example involving the analysis of a mixture of CO and $CO_2$, different from that yielded by prism 44. The operation of this system otherwise corresponds with that in Fig. 1.

Referring now to Fig. 5 there is shown a further embodiment of the invention wherein a refractive optical system is employed in place of the reflective system disclosed in Fig. 1 and wherein a monochromatic main beam is split into two monochromatic analyzing beams. The rays from one area of infra-red source 10 are cast on a collimating lens 46 where they are directed through a dispersion prism 47. The rays of the wavelength band selected by prism 47 are collected by a condenser lens 48 and concentrated so as to pass through a baffle aperture 49 and onto a collimating lens 50. Lens 50 projects a collimated monochromatic beam of the desired band onto mirros 17 and 18 of the double reflector which splits the beams into two analyzing beams 15 and 16. After being interrupted and passing through test sample cell 12 and standard sample cell 13 in the manner hereinabove disclosed in connection with Fig. 1, the analyzing beams are focused by a lens 51 onto detector 11 to produce an alternating voltage in accordance with the relative intensities of the beams. The lenses 46, 48, 50 and 51 and the prism 47 are preferably fabricated of rock salt which has a high permeability to infra-red radiation. It is pointed out that in the arrangement of Fig. 1, analyzing beams 15 and 16 may be made monochromatic by interposing a prism between source 10 and spherical mirror 14.

Referring now to Fig. 6 there is shown a modified form of the beam splitting and interrupting means employed in conjunction with the systems of either Figs. 1 or 4. In this arrangement, in lieu of alternately blocking the paths of analyzing beams 15 and 16 by means of shutters 26 and 27 as shown in Figs. 1 and 4, there is provided a rotary beam chopper member 52 which is interposed between infra-red source 10 and spherical reflector 14.

Infra-red source 10 is surrounded by a shield 53 having a pin point aperture 54 positioned so as to cast a conical beam on the reflecting surface of mirror 14, the aperture lying at the focal point of the mirror. Chopper member 52 comprises a disc 55 having a semi-circular peripheral flange 56 extending outwardly from one side thereof and a similar flange 57 extending outwardly from the other side of the disc and displaced 180° from flange 56. Disc 55 is axially rotated by motor 28. In operation, as the disc rotates, flanges 56 and 57 alternately block equal and opposing sectors 58 and 59 of the conical beam cast on mirror 14 so that two parallel analyzing beams 60 and 61 are formed each having a cross sectional area as shown in Fig. 7. The beams are directed in opposing directions by mirrors 17 and 18 of the double reflector, the remainder of the system being either in accordance with Figs. 1 or 4.

Although the various systems disclosed hereinabove for the analysis of a substance by radiant energy have been described as they operate in conjunction with a radiant energy source of the infra-red type, it will be obvious to one skilled in the art, that sources emitting rays in other regions may be employed with equal success. For example, in Fig. 2, infra-red source 10 may be replaced by an ultra-violet radiator and detector 11 may take the form of a photoelectric cell or any other means responsive to the region of radiant energy employed.

Thus there has been disclosed what are at present considered preferred embodiments of the invention. It will be evident however that in practicing the invention many changes and modifications may be made in these embodiments without departing from the essence of the invention and it is intended in the accompanying claims to cover all such changes and modifications as fall within the true spirit and scope of the invention.

What we claim is:

1. An infra-red analyzer comprising a first concave spherical mirror, a source of infra-red radiation positioned at the focal point of said first spherical mirror, the rays from a common area in said source being cast on said first spherical mirror and being reflected thereby as a substantially collimated main beam, a first double surface reflector disposed in the path of said main beam and arranged to split said main beam into separate first and second analyzing beams of equal intensity, first and second cells for containing an unknown sample of a substance being tested and a standard sample respectively, said cell having front and back windows permitting the passage therethrough of radiation, a second concave spherical mirror, a bolometer disposed at the focal point of said second spherical mirror, a second double surface reflector, means for directing said first analyzing beam from one surface of said first double reflector through said first cell and onto one surface of said second double reflector, means for directing said second analyzing beam from the other surface of said first double reflector through said second cell and onto the other surface of said second double reflector, said second double reflector being arranged to project said first and second analyzing beams in parallel paths onto said second spherical mirror whereby said first and second analyzing beams are concentrated on said bolometer, shutter means for alternately blocking said first and second analyzing beams, a direct-current source connected in series with said bolometer to produce an output voltage whose amplitude varies in accordance with the change in intensity of said first analyzing beam resulting from absorption by said first cell and the change in intensity of said second beam resulting from absorption by said second cell, means to generate a reference voltage of predetermined amplitude and phase and having a frequency corresponding to said predetermined frequency, and a phase discriminator for comparing the phase and amplitude of said output voltage relative to said reference voltage to produce a measuring voltage in accordance with the phase and amplitude of said output voltage.

2. An infra-red analyzer comprising a first concave spherical mirror, a source of infra-red radiation positioned at the focal point of said first spherical mirror, the rays from a common area in said source being cast on said first spherical mirror and being reflected thereby as a substantially collimated main beam, a first double surface reflector disposed in the path of said main beam and arranged to split said main beam into separate first and second analyzing beams of equal intensity, first and second cells for containing an unknown sample of a substance being tested and a standard sample, respectively, said cells having front and back windows permitting the passage therethrough of radiation, a second concave spherical mirror, a bolometer disposed at the focal point of said second spherical mirror, a second double surface reflector, means for directing said first analyzing beam from one surface of said first double reflector through said first cell and onto one surface of said second double reflector, means for directing said second analyzing beam from the other surface of said first double reflector through said second cell and onto the other surface of said second double reflector, said second double reflector being arranged to project said first and second analyzing beams in parallel paths onto said second spherical mirror, whereby said first and second analyzing beams are concentrated on said bolometer, shutter means for alternately blocking said first and second analyzing beams at a predetermined rate, a direct-current potential source connected in series with said bolometer to produce an output voltage whose amplitude varies alternately in accordance with the change in intensity of said first analyzing beam as a result of absorption by said first cell and the change in intensity of said second beam of a result of absorption by said second cell, means generating a reference voltage of predetermined amplitude and phase and having a frequency corresponding to said predetermined rate and means for comparing the phase and amplitude of said reference voltage with said output voltage for producing a measuring voltage depending on the amplitude and phase of said output voltage.

3. An infra-red analyzer comprising a first concave spherical mirror, a source of infra-red radiation positioned at the focal point of said first spherical mirror, the rays from a common area of said source being cast on said first spherical mirror and being reflected thereby as a substantially collimated main beam, a first double surface reflector disposed in the path of said main beam and arranged to split said main beam into first and second analyzing beams of equal intensity, said first and second analyzing beams being projected by said first double reflector in opposing directions normal to said main beam, first and second cells for containing an unknown sample of a liquid being tested and a standard sample respectively, each cell including inlet and outlet ducts for the continuous flow of said liquid and front and back windows permitting the passage therethrough of radiation, a second concave spherical mirror, a bolometer disposed at the focal point of said second spherical mirror, a second double surface reflector, first and second plane mirrors angularly positioned with respect with the front and back windows respectively of said first cell for directing said first analyzing beam from one surface of said first double reflector through said first cell and onto one surface of said second double reflector, third and fourth plane mirrors angularly positioned with respect to the front and back windows respectively of said second cell for directing said second analyzing beam from the other surface of said first double reflector through said second cell and onto the other surface of said second double reflector, said second double reflector being arranged to project said first and second analyzing beams in parallel paths onto said second spherical mirror whereby said first and second analyzing means are concentrated on said bolometer, shutter means for alternately blocking said first and second analyzing beams at a predetermined rate, a direct-current potential source connected in series with said bolometer to produce an output voltage whose amplitude varies alternately in accordance with the change in intensity of said first analyzing beam as a result of absorption by said first cell and the change in intensity of said second beam as a result of absorption by said second cell, a tuned amplifier for amplifying solely the fundamental frequency component of said output voltage to produce an output wave, means to generate a reference voltage of predetermined amplitude and phase and having a frequency corresponding to said predetermined rate and means comparing the phase and amplitude of said reference voltage with said output wave for producing a measuring voltage in accordance with the phase and amplitude of said output wave.

4. An infra-red analyzer comprising a first concave spherical mirror, a source of infra-red radiation positioned at the focal point of said first spherical mirror, the rays from a common area in said source being cast on said first spherical mirror and reflected thereby as a substantially collimated main beam, a first double surface reflector disposed in the path of said main beam and arranged to split said main beam into first and second analyzing beams of equal intensity, said first and second analyzing beams being projected by said first double reflector in separate directions displaced from said main beam, first and second cells for containing an unknown sample of a substance being tested and a standard sample respectively, each cell having front and back windows permitting the passage therethrough of radiation, a second concave spherical mirror, a bolometer disposed at the focal point of said second spherical mirror, a second double surface reflector, means for directing said first analyzing beam from one surface of said first double reflector through said first cell and onto one surface of said second double reflector, means for directing said first analyzing beam from the other surface of said first double reflector through said second cell and onto the other surface of said second double reflector, said second double reflector being arranged to project said first and second analyzing beams in parallel paths onto said second spherical mirror, whereby said first and second analyzing beams are concentrated on said bolometer, shutter means for alternately blocking said first and second analyzing beams at a predetermined rate, a first dispersion prism interposed in the path of said first analyzing beam between said first cell and said one surface of said first double reflector and arranged to select a desired monochromatic wavelength band for passage through said first cell, a second dispersion prism interposed in the path of said second analyzing beam between said second cell and said other surface of said first double reflector and arranged to select a desired monochromatic wavelength band for passage through said second cell, a direct-current source connected in series with said bolometer to produce an output voltage whose amplitude varies alternately in accordance with the change in intensity of said first analyzing beam as a result of absorption by said first cell and the change in intensity of said second beam as a result of absorption by said second cell, a tuned amplifier for amplifying solely the fundamental frequency component of said output voltage to produce an output wave, means to generate a reference voltage of predetermined amplitude and phase and having a frequency corresponding to said predetermined rate, and a phase discriminator to compare the phase and amplitude of said output wave with respect to said reference voltage to produce a measuring voltage in accordance with the phase and amplitude of said output wave.

5. In an infra-red analyzer, as set forth in claim 1, wherein said shutter means comprises a pair of masks each fixedly positioned across the path of a respective analyzing beam and having a port formed therein which is shaped as the segment of a circle to accommodate the beam incident thereto, a pair of semi-circular shutter members each rotatably positioned with respect to a respective port to intercept the beam incident thereto during one half a cycle of rotation, and a common shaft for axially rotating said pair of members, said members being affixed to said shaft at positions displaced 180° from each other whereby said first and second beams are alternately intercepted.

6. In an infra-red analyzer as set forth in claim 2, wherein said shutter means comprises a pair of masks each fixedly positioned across the path of an analyzing beam and having a port formed therein which is shaped as the segment of a circle to accommodate the beam incident thereto, a pair of semi-circular shutter members each rotatably positioned with respect to a respective port to intercept the beam incident thereto during one half a cycle of rotation, a common shaft for axially rotating said pair of members, said members being affixed to said shaft at positions displaced 180° from each other, whereby said first and second beams are alternately blocked, and a pair of shading plates each arranged to adjustably overlap the upper portion in the port of a respective mask and having an arcuate edge whose contour is congruent with the curvature of said port, each shading plate being pivotally mounted at a point whereby for each overlapping position thereof substantially the same relative degree of shading is effected for each sector of the associated port.

NOEL C. JAMISON.
OTTO G. KOPPIUS.
THOMAS R. KOHLER.
JAMES G. BLACK.

REFERENCES CITED

The following references are of record in the file of this patent:

UNITED STATES PATENTS

| Number | Name | Date |
| --- | --- | --- |
| 1,894,132 | Stone | Jan. 10, 1933 |
| 1,999,023 | Sharp et al. | Apr. 23, 1935 |
| 2,314,800 | Pineo | Mar. 23, 1943 |
| 2,462,946 | Coggeshall | Mar. 1, 1949 |
| 2,462,995 | Ritzmann | Mar. 1, 1949 |

OTHER REFERENCES

X-Ray Photometer by T. C. Michel and T. D. Rich, General Electric Review, Feb. 1947, pp. 45–48.